United States Patent Office 3,081,356
Patented Mar. 12, 1963

3,081,356
PURIFICATION OF A CRUDE C₁₄ ALDEHYDE
Louis Vincent Czarecki, Wayne, N.J., assignor to Hoffmann-La Roche Inc., Nutley, N.J., a corporation of New Jersey
No Drawing. Filed Feb. 1, 1961, Ser. No. 86,317
4 Claims. (Cl. 260—614)

The present invention relates to the purification of a polyene "$C_{14}$ aldehyde" useful as an intermediate in the preparation of synthetic vitamin A. More particularly, the instant invention relates to the purification of crude "$C_{14}$ aldehyde" by crystallization from a polar solvent.

The crude "$C_{14}$ aldehyde" purified by the process of the invention is prepared by reacting β-ionone with haloacetic esters. The "$C_{14}$ aldehyde" has been the subject of many patents and publications (see for example U.S. 2,451,740, which gives a process for its preparation) and the term "$C_{14}$ aldehyde" has acquired an accepted meaning in the vitamin A art. Previously, the crude aldehyde obtained from this process has been purified by fraction distillation or by crystallization from a non-polar hydrocarbon solvent. Fractional distillation is an unsatisfactory process since it requires special equipment to attempt to minimize the decomposition of the aldehyde which is sensitive to high temperatures. The crystallization of the "$C_{14}$ aldehyde" from hydrocarbon solvents is not satisfactory since the mother liquor from the crystallization step must be worked up to obtain additional quantities of "$C_{14}$ aldehyde" in order to bring the recovery within acceptable levels.

It has now been discovered, surprisingly, that the use of certain aqueous alcohols enables the crystallization to be carried out in a single step in high yield of relatively pure "$C_{14}$ aldehyde" without requiring the work-up of the mother liquor.

The "$C_{14}$ aldehyde" purified by the process of the invention can be used directly for the synthesis of vitamin A without requiring further purification.

The chemical structure of the "$C_{14}$ aldehyde" has not been conclusively ascertained. The following two structures have been reported:

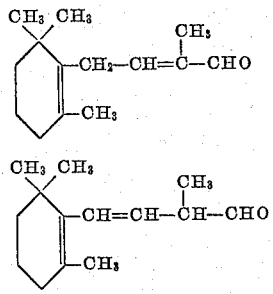

For the purposes of the present invention the intermediate will be referred to as "$C_{14}$ aldehyde."

The aqueous alcohols particularly useful in the practice of the invention are aqueous methanol and aqueous ethanol. Aqueous isopropyl alcohol and aqueous n-propyl alcohol can also be employed, and are within the broader scope of the invention, but they are not to be considered as equivalent to the aqueous methanol or aqueous ethanol since the mother liquors from their crystallizations may have to be worked up in order to obtain a high overall yield.

The process of the invention is carried out by mixing the crude "$C_{14}$ aldehyde" with the aqueous alcohol at a temperature in the range of 0° to 25° C. to form a solution, and then cooling the resulting solution to a temperature in the range of about —60° to about —20° C. in order to precipitate the "$C_{14}$ aldehyde" crystals.

If the purity of the crude "$C_{14}$ aldehyde" is less than 60% it is preferably flash-distilled once, then separated out in crude form having a purity of about 80% or more. One crystallization by the processes of the invention is sufficient to raise its purity to 90% or higher in excellent recovery. Recoveries of over 85%, frequently over 95%, based on the amount of "$C_{14}$ aldehyde" in the crude "$C_{14}$ aldehyde" recrystallized by the processes of the invention, are readily obtained. The "$C_{14}$ aldehyde" crystals are removed from the aqueous alcohol mother liquor by standard techniques. The "$C_{14}$ aldehyde" crystals can then be washed with a small quantity of aqueous alcohol, although the product is pure enough in most cases to be used for the preparation of vitamin A without washing. Another advantage of the invention lies in the fact that relatively small quantities of aqueous alcohol are employed in the crystallization step, with the attendant economic saving in solvent and a saving in equipment size and space. In fact, equal volumes of crude "$C_{14}$ aldehyde" and aqueous alcohol solvent are quite satisfactory for the crystallization process of the invention.

When aqueous methanol is used as the crystallization solvent the quantity of water therein ranges from about 1 to about 20 volume percent. The preferred temperature range to which the solution is cooled is about —60 to about —40° C., and under these conditions the quantity of water in the methanol is preferably in the range of about 7 to about 15 volume percent. The most preferred conditions are about —50° C. and a water content of about 10 volume percent in the methanol. When aqueous ethanol is used as the crystallization solvent, from about 1 to about 30 volume percent water is present and the temperature to which the solution is cooled is in the range of about —60 to about —20° C., preferably about 15 to about 20 volume percent water at a temperature range of about —40 to about —60° C., and most preferably from about 17 to about 20 volume percent water at a temperature of about —50° C. When isopropyl alcohol or n-propyl alcohol is used, about 10 to about 30 volume percent water is employed over the temperature range of about —60 to about —20° C.; preferably from about 20 to about 30 volume percent water at a temperature range of about —60 to about —40° C.

The solution of "$C_{14}$ aldehyde" in aqueous alcohol can be cooled by any technique such as by immersing a container of the solution in a suitable cooling bath. However, a preferred method is to add solid or liquid carbon dioxide to the solution with stirring until the temperature has dropped to the desired extent.

While the crude "$C_{14}$ aldehyde" purified by the process of the invention is obtained from the reaction between β-ionone and haloacetic esters, the purification process of the invention is not limited to crude "$C_{14}$ aldehyde" prepared by this process, and crude "$C_{14}$ aldehyde" prepared by any process can be purified in accordance with the process of the invention.

The invention will be better understood by reference to the following examples which are given for purposes of illustration only and are not meant to limit the invention.

Example 1

A mixture of 500 ml. of anhydrous methanol and 50 ml. of water is added to 500 ml. (474 g.) of crude flash-distilled "$C_{14}$ aldehyde" prepared by the reaction of β-ionone with ethyl chloracetate, and assaying 90.5% "$C_{14}$ aldehyde." The resulting mixture is then agitated in a resin reaction flask and thereafter cooled in an acetone-Dry Ice bath to —15° C., at which temperature a pure crystal of "$C_{14}$ aldehyde" is added for seeding purposes. The temperature is then further reduced to —50° C. and held at this temperature for one hour. The precipitated "$C_{14}$ aldehyde" is then separated from the mother liquor by connecting a suction flask to the bottom outlet of the resin reaction flask and withdrawing the mother liquor. The crystals of "$C_{14}$ aldehyde," which remain in the flask, are washed with a mixture of 500 ml. of anhydrous methanol and 50 ml. of water maintained at $-50°$ C. 420 g. of crystalline "$C_{14}$ aldehyde" which assays 97.4% is obtained representing a 95.3% recovery of "$C_{14}$ aldehyde" from the crude.

*Example 2*

The process of Example 1 is repeated except that anhydrous solid carbon dioxide is dropped into the solution with stirring to cool the solution to the desired temperatures.

*Example 3*

936 g. of crude "$C_{14}$ aldehyde," assaying 89.8% pure, is mixed with a mixture of 1000 ml. of methanol and 100 ml. of water, and the resulting mixture stirred and cooled by adding Dry Ice to the solution until the temperature drops to $-25°$ C. The mixture is maintained at this temperature for two hours. The "$C_{14}$ aldehyde" crystals which precipitate during the cooling step are filtered and washed with a mixture of 500 ml. of methanol and 50 ml. of water maintained at $-25°$ C. 710 g. of 95.4% pure "$C_{14}$ aldehyde" are obtained.

The filtrate is flashed to dryness leaving a residue of 226 g. To this residue is added 230 ml. of methanol and 23 ml. of water and a second crystallization carried out in the above manner. A second crop of "$C_{14}$ aldehyde" is obtained which weighs 65.5 g. and assays 91.0% pure.

*Example 4*

944 g. of crude "$C_{14}$ aldehyde" of 85.8% purity is mixed at room temperature with a solution of 1000 ml. of ethanol and 170 ml. of water. The resulting mixture is stirred and then cooled to $-50°$ C. by adding anhydrous solid carbon dioxide thereto with stirring. The temperature is maintained at $-50°$ C. for one hour. The filtrate is then removed from the precipitated crystals by the technique used in Example 1, and the crystals washed with a solution of 500 ml. of ethanol and 85 ml. of water maintained at $-50°$ C. 790 g. of "$C_{14}$ aldehyde," assaying 95.6% pure, are recovered representing a 93.2% recovery of "$C_{14}$ aldehyde."

*Example 5*

950 g. of 83.6% pure "$C_{14}$ aldehyde" is stirred with a solution of 1500 ml. of methanol and 120 ml. of water. The resulting mixture is then cooled to $-50°$ C. for one hour by addition of anhydrous solid carbon dioxide. At the end of this time the mother liquor is removed by the technique described in Example 1 and the crystals washed with a solution of 750 ml. of methanol and 60 ml. of water maintained at $-50°$ C. 740 g. of 95% pure "$C_{14}$ aldehyde" are recovered representing a recovery of 88.5%.

Modifications of the invention can be made by those skilled in the art without departing from the scope or spirit of the invention.

I claim:

1. A process for the purification of crude "$C_{14}$ aldehyde," consisting of dissolving the crude "$C_{14}$ aldehyde" in an aqueous alcohol selected from the group consisting of methanol, ethanol, and propanol wherein the aqueous alcohol contains from about 1 to about 30 volume percent of water, lowering the temperature to a temperature in the range of about $-60°$ to about $-20°$ C. to crystallize "$C_{14}$ aldehyde" crystals therefrom, and recovering said "$C_{14}$ aldehyde" crystals.

2. A process for the purification of crude "$C_{14}$ aldehyde," consisting of dissolving the crude "$C_{14}$ aldehyde" in aqueous methanol containing from 1 to 20 volume percent water therein, lowering the temperature to a temperature in the range of about $-60°$ to about $-20°$ C. to crystallize "$C_{14}$ aldehyde" crystals therefrom, and recovering said "$C_{14}$ aldehyde" crystals.

3. A process of claim 2 wherein said aqueous methanol contains from about 7 to about 15 volume percent water and said temperature is in the range of about $-60°$ to about $-40°$ C.

4. A process for the purification of crude "$C_{14}$ aldehyde," consisting of dissolving the crude "$C_{14}$ aldehyde" in aqueous ethanol containing from 1 to 30 volume percent water therein, lowering the temperature to a temperature in the range of about $-60°$ to about $-20°$ C. to crystallize "$C_{14}$ aldehyde" crystals therefrom, and recovering said "$C_{14}$ aldehyde" crystals.

References Cited in the file of this patent

UNITED STATES PATENTS 2,700,058   Pasternack et al. _____ Jan. 18, 1955

OTHER REFERENCES

Weissberger: Technique of Organic Chemistry, vol. III (1950), pages 477–478 (copy in library).